Jan. 18, 1944.                C. I. HALL                2,339,636
                            HEATING SYSTEM
                         Filed Oct. 19, 1942
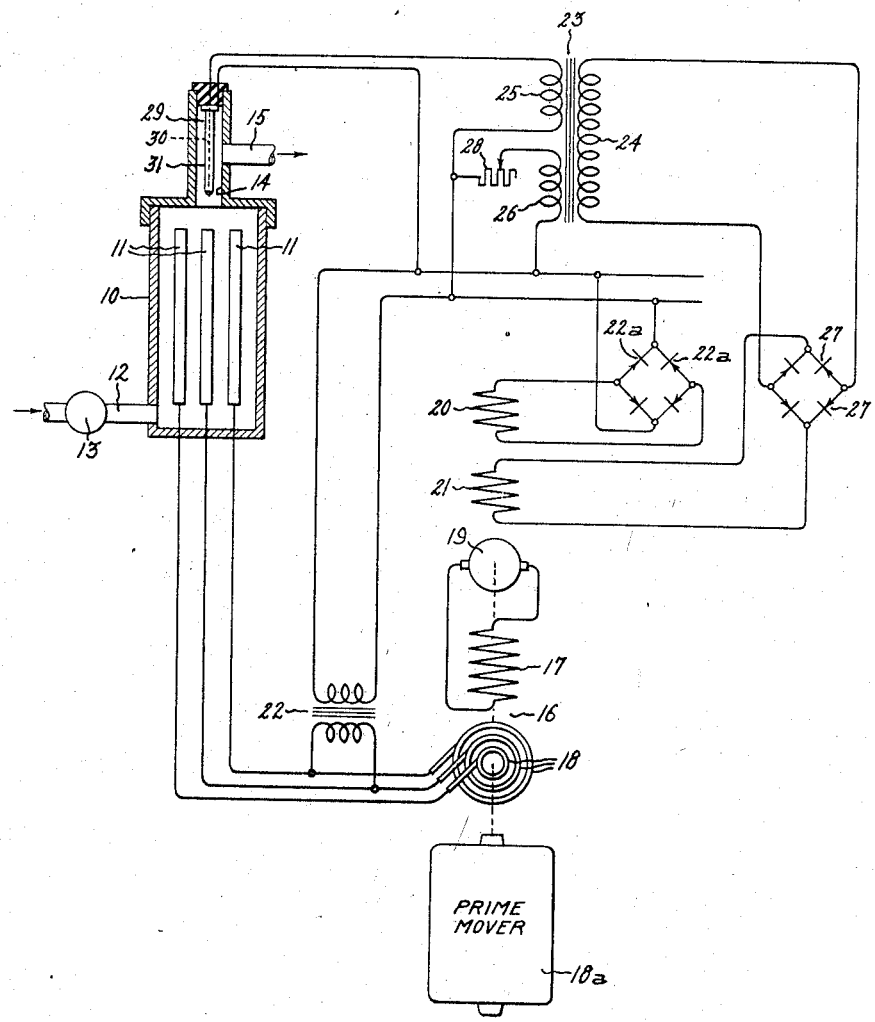
Inventor:
Chester I. Hall,
by Harry E. Dunham
His Attorney.

Patented Jan. 18, 1944

2,339,636

UNITED STATES PATENT OFFICE 2,339,636

HEATING SYSTEM

Chester I. Hall, Rexford, N. Y., assignor to General Electric Company, a corporation of New York Application October 19, 1942, Serial No. 462,469

8 Claims. (Cl. 219—40)

This invention relates to heating systems, more particularly to electrical heating systems for treating a liquid, and it has for its object the provision of an improved system of this character.

While it is not limited thereto, this invention is especially useful in the pasteurization of milk and other liquids, and particularly to pasteurizers of large capacity and where electrical energy is not available or the cost rates of available energy are relatively high.

In accordance with this invention, a heating chamber is provided which has spaced electrodes; and the liquid to be heated is caused to flow through the chamber in contact with the electrodes so that it forms an electrically conducting path between them, the liquid being heated by its resistance to the passage of current through it.

An alternating current generator, driven by a prime mover, such as a Diesel engine, is connected to the electrodes to impress upon them an alternating voltage. The voltage supplied to the field winding of the generator is controlled by a temperature responsive element so that the voltage is varied inversely with changes in the temperature of the liquid; this varies the voltage impressed upon the electrodes inversely with changes in the liquid temperature so that the temperature is held at a substantially constant value.

For a more complete understanding of this invention, reference should be had to the accompanying drawing in which the single figure is a diagrammatic representation of the heating system embodying this invention.

Referring to the drawing, this invention has been shown in one form as applied to a heating system for pasteurizing milk. The system comprises a treating chamber 10 having therein a plurality of spaced electrodes 11. While any suitable number of electrodes may be used, I prefer to use three, and prefer to use the three-phase electrode chamber which is described and claimed in my copending application, Serial No. 456,660, filed August 29, 1942, issued as Patent No. 2,324,837, July 20, 1943, and assigned to the same assignee as the present invention. The milk to be treated is forced into the lower end of the chamber 10 through a pipe 12 by means of a suitable pump 13, and at its upper end it flows out of the chamber into a holding chamber 14 from which it discharges through a pipe 15.

The three electrodes 11 are supplied by an alternating current source consisting of a three-phase alternating current generator 16 provided with a direct current field winding 17; as shown, the three electrodes are connected respectively to the three brushes 18 of the armature circuit of the generator. The generator may be driven by any suitable prime mover, such as a Diesel engine 18a.

The direct current field winding 17 is supplied by a direct current exciter 19 having a pair of field windings 20 and 21, the field winding 17 of the generator being connected in the armature circuit of the exciter, as shown. The armature of the exciter is driven by the prime mover 18a through the generator shaft. It will be understood that the voltage in the armature circuit of the generator will depend upon that supplied to the field winding 17 by the exciter—when the voltage supplied by the exciter increases, that of the armature circuit increases, and conversely, when the exciter voltage decreases, that of the armature circuit will decrease. It will also be understood that when the general excitation of the two exciter windings 20 and 21 increases that of the field winding 17 will increase, and when this general excitation decreases, that of the winding 17 will decrease.

The field winding 20 of the direct current exciter 19 is supplied with a continuous substantially constant voltage from any suitable source of supply, but preferably it will be supplied from the armature circuit of the generator 16, as shown; and as shown, it will be connected to this circuit through a suitable constant voltage transformer 22 so that irrespective of variations in the voltage in the armature circuit the voltage impressed upon the field winding 20 will remain constant. Interposed between the winding 20 and the secondary winding of the transformer 22 are a plurality of uni-laterally conducting devices 22a connected in the circuit to produce full wave rectification.

The second field winding 21 of the exciter 19 is supplied with a voltage which is controlled in accordance with the temperature of the milk leaving the electrode chamber 10, more specifically, in accordance with the temperature of the milk in the holding chamber 14. For this purpose, the winding 21 is electrically supplied from the constant voltage transformer 22 through a suitable amplifying unit 23 which, as shown, is in the form of a transformer having a single secondary winding 24 and a pair of primary windings 25 and 26. Interposed in the connections between the secondary winding 24 and the field winding 21 are a plurality of devices 27 similar to the devices 22a for producing full wave rectification.

The primary winding 26 is supplied with a constant continuous voltage from the transformer 22. The exciting effect of the winding may be adjusted by means of a suitable resistance 28 connected in its circuit; this is for the purpose of setting the temperature of the milk.

The voltage impressed upon the primary winding 25, however, is varied in accordance with the variations in the temperature of the milk in the chamber 14. As shown, it is connected to the secondary of the constant voltage transformer 22 through a suitable temperature responsive control element 29 located in the holding chamber 14 so as to respond to the temperature of the milk leaving the treating chamber 10.

The control element 29 has a high negative temperature coefficient whereby it has a high initial resistance that is reduced as the temperature of the element increases. While any suitable element may be used, I prefer to use that which is described and claimed in United States Patent No. 2,271,975, issued to me on February 3, 1942. As fully described there, this element comprises an inner electrode 30 and an outer electrode 31; interposed between these electrodes is a suitable resistance material having a high negative temperature coefficient. This element is connected in series with the primary winding 25 so that the voltage impressed upon this winding is caused to vary with variations in the milk temperature.

The two field windings 20 and 21 of the exciter may be cumulative or they may oppose each other. If they are cumulative, then the primary windings 25 and 26 of the transformer 23 must be arranged to oppose each other, whereas if the windings 20 and 21 oppose each other then the two windings 25 and 26 must be cumulative.

Assuming that the windings 20 and 21 of the exciter oppose each other, then the winding 20 must have a sufficient number of ampere turns to provide excitation to produce the proper maximum voltage at the electrodes, because at the start when the milk is cold a minimum voltage will be impressed upon the second winding 21, and any change thereafter in the excitation of the exciter in response to increases in the milk temperature will result from increases in the excitation of the opposing winding 21. That is, when the milk is cold the element 29 will permit substantially no voltage to be impressed upon the primary winding 25 and the only voltage that will be impressed upon the exciter winding 21 will be through the primary winding 26. However, as the temperature of the milk increases the resistance of the element 29 will rapidly drop so that more current may flow to the primary winding 25. This winding, under the conditions assumed, will add its effect to that of the winding 26 so that the voltage of the field 21 will increase. This voltage will oppose that of the winding 20 which will result in a decrease in the excitation applied to the generator winding 17 with a consequent reduction in the voltage in the armature circuit of the generator, and of course, a reduction in the voltage impressed on the electrodes 11.

If, therefore, it be assumed that the milk has substantially the pasteurizing temperature, and if this temperature should rise above the desired value, then the voltage impressed on the electrodes 11 will be reduced which will reduce their heating effect so that the temperature of the milk will fall and return to the desired value. Conversely, if the temperature of the milk falls below the desired value, the resistance of the element 29 will increase so that the voltage impressed upon the winding 21 decreases which will result in an increase in the voltage impressed on the field 17. This, of course, results in an increase in the voltage impressed on the electrodes 11 which, therefore, will increase their heating effect. In this way the system functions to automatically vary the voltage in the armature circuit of the generator as an inverse function of changes in the milk temperature so that this temperature is held at a substantially constant value.

The adjustable resistance 28 of the constant voltage primary winding 26 of the transformer 23 is adjusted to control the temperature that is held in the milk. If, as has been assumed, the two exciter windings 20 and 21 oppose each other, then when the resistance 28 is increased to reduce the current in the primary winding 26, the voltage impressed upon the winding 21 will be decreased with a resultant increase in the voltage impressed upon the field winding 17 and a consequent increase in the voltage of the electrodes 11. This, of course, will increase the temperature held in the milk stream. Conversely, if the resistance 28 be reduced, then the voltage impressed upon the electrodes 11 will be reduced and the temperature of the milk will be decreased. In either case, the changes in voltage at the electrodes results in a new balance between temperature and voltage which will result in the temperature control element 29 controlling at a new temperature.

If the two windings 20 and 21 of the exciter 19 are cumulative, rather than in opposition, then the winding 20 must have only enough ampere turns to give the proper minimum voltage at the electrodes; and the two windings 25 and 26 of the transformer 23 will be in opposition. As the temperature of the milk increases the effect of the opposing winding 25 of the transformer will increase so as to reduce the voltage applied to the winding 21 whereby the excitation of the exciter will be decreased so as to reduce the voltage impressed upon the voltage generator field 17 and, therefore, that impressed upon the electrodes 11; this, of course, results in a decrease in the heating effect of the electrodes. Conversely, for a falling milk temperature, the effect of the opposition winding 25 is reduced which, of course, results in an increase in the voltage impressed on the winding 21 which added to that of the winding 20 increases the excitation of the exciter and thereby effects an increase in the voltage of the winding 17 to increase the voltage impressed on the electrodes 11 and thereby their heating effect.

As before, the temperature of the milk is adjusted by the resistance 28. If this resistance be increased, the exciting effect of the winding 26 is reduced, which reduces the excitation of the exciter winding 21 and thereby reduces the general excitation of the exciter; this, of course, reduces the electrode voltage and reduces the temperature setting; conversely, if the resistance 28 be reduced the excitation at the electrodes will be increased and the milk temperature will be raised.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A system for pasteurizing a liquid comprising spaced electrodes for contacting the liquid so that the liquid forms a resistance path between the electrodes and is heated by the passage of current between the electrodes, an alternating current generator for impressing an alternating voltage on said electrodes, and means responsive to the temperature of the liquid for controlling the excitation of said generator so as to vary the voltage impressed on said electrodes as an inverse function of said temperature to thereby hold it at a substantially constant value.

2. A system for pasteurizing a liquid comprising spaced electrodes for contacting the liquid so that the liquid forms a resistance path between the electrodes and is heated by the passage of current between the electrodes, an alternating current generator for controlling the voltage impressed on said electrodes, and means responsive to the temperature of the liquid for controlling the excitation of said generator so as to vary the voltage impressed on said electrodes as an inverse function of said temperature to thereby hold it at a substantially constant value.

3. A liquid pasteurizing system comprising a plurality of spaced electrodes, means for directing the liquid between said electrodes so that the liquid forms a resistance path connecting the electrodes and is heated by the current flowing between them, an alternating current generator, connections between the armature of said generator and said electrodes for supplying the electrodes with an alternating voltage, a direct current field winding for said generator, and means responsive to the temperature of said liquid for supplying to said field winding a modulated direct current voltage which varies as an inverse function of changes in said temperature so that a substantially constant temperature is held in said liquid.

4. A liquid pasteurizing system comprising three spaced electrodes, means for directing the liquid between said electrodes so that the liquid forms a resistance path connecting the electrodes and is heated by the current flowing between them, a three phase alternating current generator having its armature circuit electrically connected with said electrodes to impress upon them an alternating voltage, and means responsive to the temperature of the liquid for controlling the excitation of said generator so as to vary the voltage impressed on said electrodes as an inverse function of said temperature to thereby hold it at a substantially constant value.

5. A liquid pasteurizing system comprising a plurality of spaced electrodes, means for directing the liquid between said electrodes so that the liquid forms a resistance path connecting the electrodes and is heated by the current flowing between them, an alternating current generator, connections between the armature of said generator and said electrodes for supplying the electrodes with an alternating voltage, a direct current field winding for said generator, a direct current exciter for said field winding provided with a pair of fields, means for supplying one of said fields with a substantially constant voltage, and temperature responsive means for varying the voltage of the other as the temperature in said liquid varies, the fields being constructed and arranged and related to each other so that the resulting excitation impressed on said exciter is an inverse function of the temperature changes so that the voltage impressed upon said electrodes likewise is varied as an inverse function of said temperature changes to thereby hold said temperature at a substantially constant value.

6. A liquid pasteurizing system comprising a plurality of spaced electrodes, means for directing the liquid between said electrodes so that the liquid forms a resistance path connecting the electrodes and is heated by the current flowing between them, an alternating current generator, connections between the armature of said generator and said electrodes for supplying the electrodes with an alternating voltage, a direct current field winding for said generator, a direct current exciter for said field winding provided with a pair of fields, means for supplying one of said fields with a substantially constant voltage, a transformer for controlling the voltage supplied to the other of said windings provided with a single secondary winding connected to said other winding and two primary windings, means for supplying to one of said primary windings a constant voltage, means for controlling the exciting effect of said winding, means for supplying to the other primary winding a voltage that varies inversely with the changes in the temperature of said liquid, said field windings of said exciter and said primary windings being constructed and arranged and related so that when said temperature changes, an inverse change is effected in the voltage of said exciter, whereby the voltage impressed on said electrodes by said generator is changed inversely with changes in said temperature.

7. A system for pasteurizing a liquid comprising a chamber, spaced electrodes therein, means for forcing the liquid through said chamber, the liquid being heated by the passage of current through it, an alternating current generator for impressing on said electrodes an alternating voltage, a pair of control windings for controlling the excitation of said generator, means for supplying one of said windings with a substantially constant voltage, and temperature responsive means for varying the voltage supplied to the other as the temperature in said liquid varies so that the general excitation of said generator is an inverse function of the temperature changes whereby the voltage impressed on said electrodes also varies inversely with said temperature changes in order to hold said temperature at a substantially constant value.

8. A liquid pasteurizing system comprising a plurality of spaced electrodes, means for directing the liquid between said electrodes so that the liquid forms a resistance path connecting the electrodes and is heated by the current flowing between them, an alternating current generator, connections between the armature of said generator and said electrodes for supplying the electrodes with an alternating voltage, a direct current field winding for said generator, a direct current exciter for said field winding provided with a pair of fields, means connecting one of said fields with the armature of said generator through a constant voltage transformer so that it has impressed on it a constant voltage irrespective of variations in the voltage of said armature, and temperature responsive means for varying the voltage of the other field as the temperature in said liquid varies, the two fields being related so that the general excitation of said exciter is an inverse function of the temperature changes whereby the voltage impressed upon said generator field winding and that on said electrodes likewise is varied as an inverse function of said temperature changes to thereby hold said temperature at a substantially constant value.

CHESTER I. HALL.